US005802694A

United States Patent [19]

Myles

[11] Patent Number: 5,802,694

[45] Date of Patent: Sep. 8, 1998

[54] PISTON SPIRAL LOCK REMOVAL TOOL AND METHOD

[76] Inventor: Gary M. Myles, 28173 Hilliard Blvd., Westlake, Ohio 44145

[21] Appl. No.: 859,067

[22] Filed: May 20, 1997

Related U.S. Application Data

[60] Provisional application No. 60/018,222 May 22, 1996.

[51] Int. Cl.[6] .................... B23P 19/00

[52] U.S. Cl. .................... 29/426.6; 29/888.041; 29/402.03; 29/240; 29/270

[58] Field of Search .................... 29/888.041, 888.05, 29/402.03, 402.08, 426.1, 426.6, 456, 221.6, 222, 227, 239, 240, 240.5, 270

[56] References Cited

U.S. PATENT DOCUMENTS

| | | | |
|---|---|---|---|
| 4,226,013 | 10/1980 | Helesfai | 29/235 |
| 5,214,831 | 6/1993 | Collins, Jr. et al. | 29/240.5 |

*Primary Examiner*—David P. Bryant
*Attorney, Agent, or Firm*—Fay, Sharpe, Beall, Fagan, Minnich & McKee

[57] ABSTRACT

A tool is disclosed for removing a multi-turn spiral lock received in a groove of a piston assembly. The tool includes a handle for transmitting manual torque forces to a tool head. The tool head includes a terminal edge adapted for receipt under the end of a spiral lock. The head further includes a first wedge surface for radially urging the spiral lock from its associated groove and a second wedge surface for lifting one turn of the spiral lock from an adjacent turn.

9 Claims, 2 Drawing Sheets

PISTON SPIRAL LOCK REMOVAL TOOL AND METHOD

This application claims benefit of Provisional Appln. No. 60/018,222, filed May 22, 1996.

BACKGROUND OF THE INVENTION

The subject invention is directed to a tool used to remove a fastener from a workpiece and the method of removing the fastener. More specifically, the tool is intended to remove a spiral lock that retains or holds a wrist pin, that holds the connecting rod, from being axially removed from a cross bore of a piston and thus will be described with reference to that environment. However, it will be appreciated that the invention has broader applications and may be advantageously used in other environments and applications that have similar structural and functional considerations.

The spiral lock is a metal retaining ring or snap ring type of fastener comprised of a single helical coil having multiple turns that is received in a groove of a workpiece. Like other retaining rings, it is designed to accurately locate or retain a workpiece on a shaft or in the bore of a housing. Once the spiral lock is removed from the groove, the workpiece can be removed from the bore of the housing.

The particular environment at issue with the present invention is a spiral lock used to retain a wrist pin in place. The spiral lock used in this environment typically has three turns or rotations for receipt in a groove of a cross bore of the piston that receives the wrist pin. To disassemble the piston assembly, it is necessary to remove the spiral lock so that the wrist pin can be removed from the connecting rod bore. This is a very difficult and tedious procedure for which no adequate method of removal or tool to assist in removal is known. Service technicians have used knife edges or similar tools in an attempt to lift an end of the spiral lock from the remaining turns of the fastener. The service technicians are frequently frustrated in attempts to remove the spiral lock from the groove or often cut or tear their fingers while trying to remove the spiral lock. Accordingly, a need exists for a tool that effectively and easily removes spiral locks.

Additionally, it is recognized that different engines have different size piston assemblies and thus employ a spiral lock of a predetermined size. Thus, a tool must be able to accommodate different size wrist pins and, more particularly, different size spiral locks.

SUMMARY OF THE INVENTION

The present invention contemplates a new and improved tool that overcomes the above referenced problems and others and provides a simple, economical, and versatile apparatus and method of using the tool for removing spiral locks from piston assemblies.

According to the present invention, there is provided a tool having a handle that is adapted to be grasped by a user. A generally circular-shaped surface is disposed at one end of the handle and includes a pointed terminal end that is adapted for receipt under an end of an associated spiral lock. A first wedge-shaped surface extends generally radially from the terminal end of the tool for separating a turn of the spiral lock from an abutting, adjacent turn of the spiral lock. A second wedge-shaped surface extends generally in the circumferential direction of the circular shaped surface for lifting the separated turn of the spiral lock from the groove.

According to another aspect of the invention, the circular-shaped surface is removably connected to the handle so that different size surfaces can be used with the same tool.

According to yet another aspect of the invention, the preferred method of removing the spiral lock includes disposing a terminal end of the tool beneath an end of the spiral lock, rotating the tool to separate adjacent turns of the spiral lock and simultaneously lift the spiral lock from the groove.

A principal advantage of the invention is the ease with which a spiral lock can be removed from a groove.

Another advantage of the invention is the ability to easily change the tool to accommodate different size spiral locks.

Still other benefits and advantages of the invention will become apparent to those skilled in the art upon reading the following detailed description of the invention.

BRIEF DESCRIPTION OF THE DRAWINGS

The invention may take different physical form in certain parts or arrangement of parts. However, a preferred embodiment of the invention, which will be described in detail in the following specification, is illustrated in the accompanying drawings, wherein.

DETAILED DESCRIPTION OF THE PREFERRED EMBODIMENT AND METHOD

Figure 1:
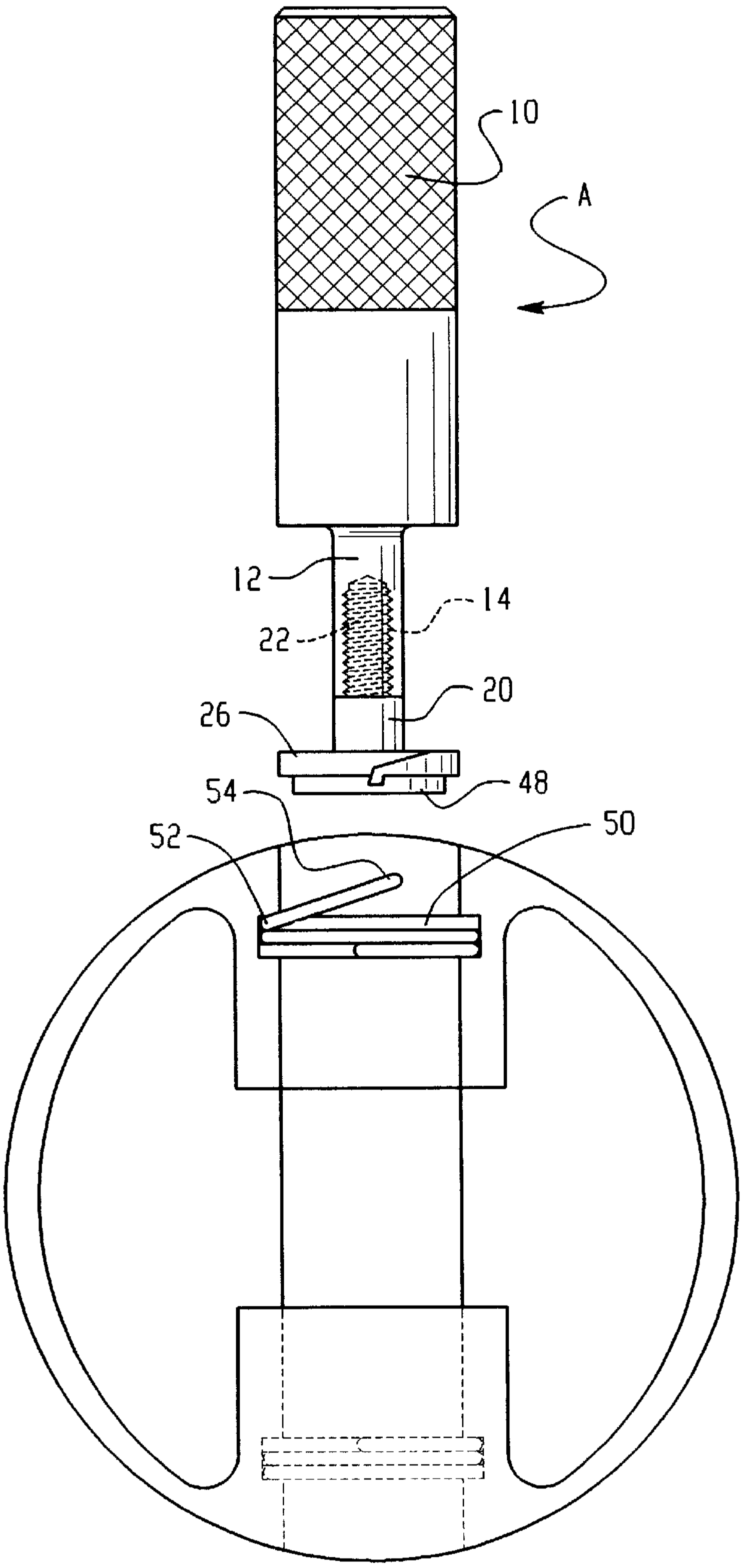
FIG. 1 is an elevational view of the inventive tool disposed adjacent a spiral lock holding a wrist pin in place in a piston assembly.
Figure 2:
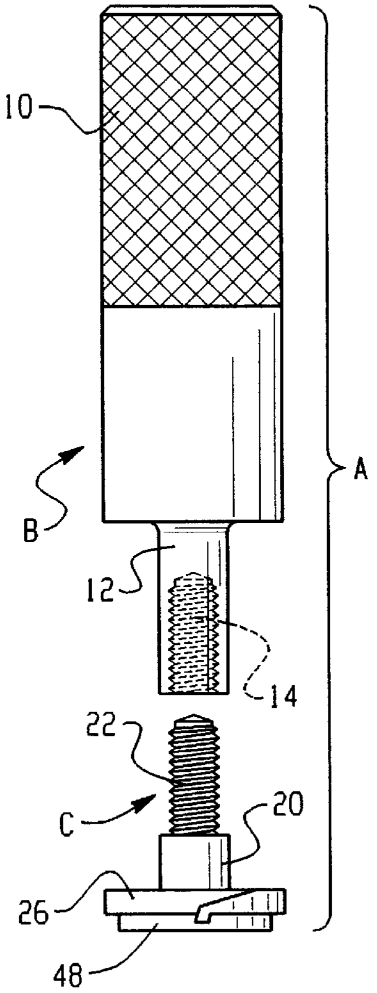
FIG. 2 is an elevational view of the disassembled tool.

With reference to the drawings illustrating the preferred embodiment of the invention, and method of using the tool, the Figures show a spiral lock removal tool A having a handle B and a tool head C. More specifically, and as shown in FIGS. 1 and 2, the tool handle is dimensioned to be easily grasped in a user's hand and preferably has a cylindrical knurled surface 10 that provides a non-slip surface allowing the user to exert torque to the tool. A necked down region 12 of smaller diameter includes a threaded recess 14 that is adapted to removably receive the tool head C therein. In the preferred arrangement, the handle is formed from a single piece of material that is machined to provide a comfortable size that easily fits in the palm of a user's hand, e.g. three to four inches in length and approximately one inch in diameter. These dimensions, however, are merely exemplary and it will be understood that other configurations and sizes can be used without departing from the scope and intent of the invention. Likewise, the entire enlarged diameter portion of the handle may include a roughened surface or, if desired, only a portion thereof may include the knurled region.

Figure 3:
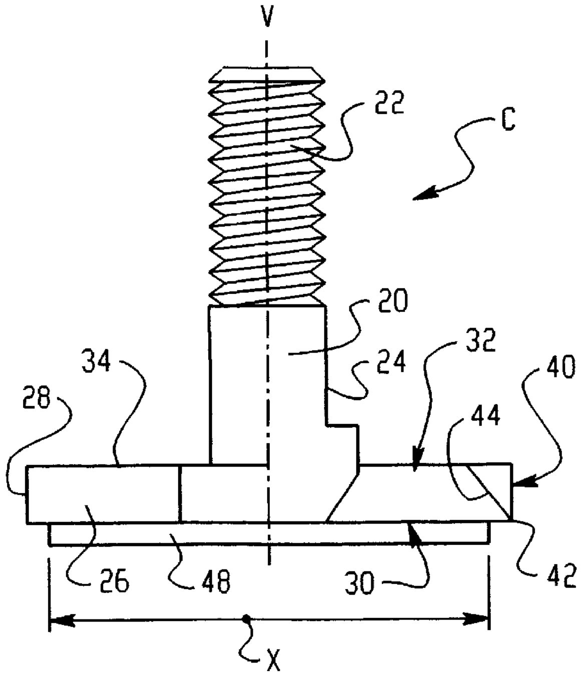
FIG. 3 is an enlarged elevational view of a tool head.
Figure 4:
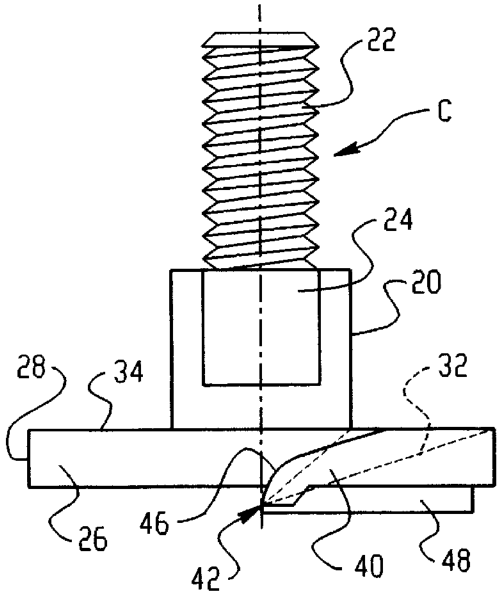
FIG. 4 is an elevational view of the tool head rotated through 90° from the position of FIG. 3.
Figure 5:
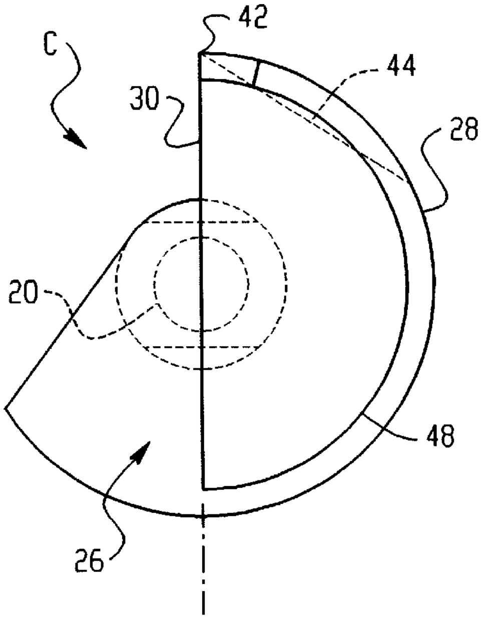
FIG. 5 is a bottom plan view of the tool head.

The tool head C includes a reduced diameter mounting region 20 that is preferably externally threaded as represented by numeral 22. The thread is selected, for example, to have a right-hand thread pitch so that as the entire tool is manually rotated in an advancing right-hand thread direction, the tool head is urged into tight connection with the handle. A tool flat 24 (FIGS. 3 and 4) is provided on the tool head to facilitate gripping engagement by a tool such as a wrench or pliers to secure the head to the handle.

The head includes a generally D-shaped, or circular-shaped, disk-like portion 26 having an outer periphery 28 dimensioned to closely match the diameter of the wrist pin. As shown, the portion 26 does not form a complete disk, i.e., it does not extend an entire 360°, but can range from approximately 180° to the illustrated approximate 270°, although greater or lesser dimensions may be used with equal success. A radial edge 30 of the disk-like portion 26 has a minimum height, preferably forming a knife edge that defines one end of a helical surface 32 that ramps around the upper surface of the disk-like portion and merges into a constant thickness 34 over the remaining circumferential extent of the disk.

It is important to note that the surface 32 does not extend to the outer circumference of the disk. Rather, a raised ridge 40 having a terminal end 42 that includes two wedge surfaces 44, 46 is provided. The wedge surfaces are disposed in generally perpendicular orientations. That is, the first wedge surface 44 proceeds from a terminal edge 42 and increases in a radial dimension (FIG. 3) as the ridge proceeds circumferentially about the disk. The second wedge surface 46 increases in height (FIG. 4) as the ridge proceeds circumferentially about the disk.

Figure 6:
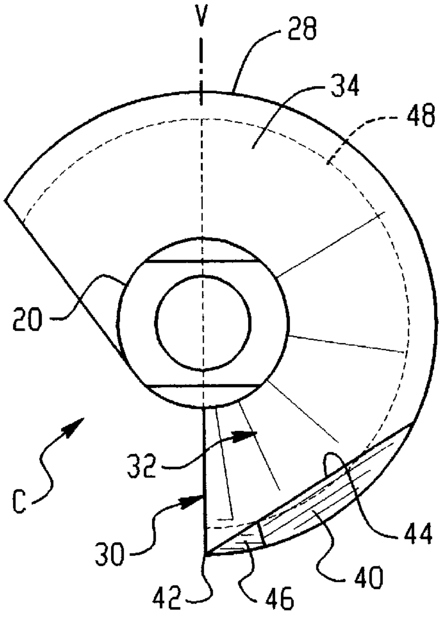
FIG. 6 is a top plan view of the tool head.

As is apparent in FIG. 6, for example, the outer circumference 28 of the ridge has a substantially constant diameter allowing the tool to be inserted into the bore that receives the wrist pin. Thus, the first and second wedge surfaces 44, 46 primarily contribute to the lifting of the spiral lock from the associated wrist pin groove and separating one turn of the spiral lock from an adjacent turn as will be described in greater detail below. Moreover, the helical surface 32 urges the separated portion of the spiral lock upwardly and away from the remainder of the spiral lock as the tool is rotated relative to the wrist pin. This allows the spiral lock to be gradually eased from the groove and minimizes the forces required to accomplish the removal task.

A shoulder 48 is provided on a face of the disk portion opposite from the stem 20. The shoulder 48 is dimensioned, as represented by "x" in FIG. 3, for receipt in the inner diameter of the spiral lock 50 when it is mounted in the groove 52 of the piston (FIG. 1). Thus, the shoulder has a height comparable to one turn of the spiral lock so that the tool head is accurately located in the spiral lock.

The terminal end of the tool head is dimensioned to fit under the end 54 of the spiral lock 50 (FIG. 1). As the tool is rotated, the wedge surface 44 engages the spiral lock end and urges it radially inward along the inner radial surface of the ridge on to the helical surface 32. The spiral lock is thus prevented by the ridge from snapping off the outer radial edge of the tool and back into the wrist pin groove.

Simultaneously, the wedge surface 46 lifts the spiral lock in a direction generally parallel to the axis of the wrist pin. This lifting action separates one turn of the spiral lock from another and as the tool is rotated, eventually lifts the entire spiral lock onto the upper surface of the disk. The tool is then axially removed from the piston with the spiral lock disposed about the mounting region 20 of the tool head.

It is recognized that different tool heads may be required for different size bores and spiral locks. Accordingly, the tool head can be removed from the handle by rotating the head relative to the handle (with the assistance of a wrench or other tool on the tool flat, if necessary). A new tool head is then received in the threaded recess of the handle and the operation proceeds as described above.

Figure 7:
FIG. 7 is an enlarged detail view of the end of a spiral lock.

FIG. 7 illustrates that the outermost and forwardmost edge of the spiral lock may be rounded to provide for smooth operation of the tool on the spiral lock. The rounded corner allows the end of the spiral lock to be easily separated from an adjacent turn of the spiral lock and smoothly engaged by the tool head. It is recognized, however, that in some spiral lock arrangements, the edge need not be rounded off since the manufacturer has already performed this operation.

The invention has been described with reference to the preferred embodiment. Obviously, modifications and alterations will occur to others upon reading this specification. For example, the handle need not necessarily be cylindrical in shape or use a knurled surface, but may adopt a wide variety of configurations that assist the user in transferring manual torque to the tool head. Moreover, although it is preferred that the edges of the tool head that engage the spiral lock are knife-like, it is understood that other surfaces that still engage beneath the spiral lock may also work. However, the combination of knife edges and wedges as described above are believed to provide superior performance. The invention is intended to include all such modifications and alterations in so far as they come within the scope of the following claims or the equivalents thereof.

Having thus described the invention, it is now claimed:

1. A tool for removing a multi-turn spiral lock received in a groove of a piston assembly, the tool comprising:

a handle dimensioned for receipt in and grasping by a user's hand and transmitting manual torque forces;

a disk-shaped tool head having a terminal edge adapted for receipt under the end of a spiral lock, the head further including a first wedge surface for radially urging the spiral lock from its associated groove and a second wedge surface for lifting one turn of the spiral lock from an adjacent turn.

2. The tool as defined in claim 1 wherein the tool head is removably connected to the handle to allow different size tool heads to be alternately used with the handle.

3. The tool as defined in claim 1 wherein the tool head further includes a helical surface that receives the spiral lock as it is removed from its associated groove.

4. The tool as defined in claim 3 wherein the helical surface extends from an inner radial location to the terminal edge.

5. The tool as defined in claim 1 wherein the second wedge surface extends from the terminal edge along the perimeter of the tool head for lifting the spiral lock from the groove.

6. The tool as defined in claim 1 wherein the first wedge surface includes a peripheral ridge that urges the spiral lock radially inward.

7. The tool as defined in claim 1 wherein the tool head is removably connected to the handle and the tool head includes tool flats to assist in installing and removing the tool head from the handle.

8. The tool as defined in claim 1 wherein the tool head is a D-shaped disk in which approximately one-half of a flat perimeter of the disk defines a radially extending knife edge that merges in the circumferential direction with an upper surface that receives the spiral lock once it is removed from the groove, and the knife edge is disposed radially inward of the terminal edge and the first and second wedge surfaces.

9. A method of removing a spiral lock from a groove comprising the steps of:

inserting an edge of a tool beneath an end of the spiral lock;

rotating the tool about an axis to advance the tool edge through the turns of the spiral lock; and while rotating the tool, lifting a turn of the spiral lock from an adjacent turn of the spiral lock and urging the lifted turn radially inward toward the axis of rotation.

* * * * *